US012798142B2

(12) United States Patent
Kishida et al.

(10) Patent No.: US 12,798,142 B2
(45) Date of Patent: Nov. 17, 2026

(54) WASTE REMOVING DEVICE FOR BAG MAKING APPARATUS AND BAG MAKING APPARATUS

(71) Applicant: Totani Corporation, Kyoto (JP)

(72) Inventors: Munenori Kishida, Kyoto (JP); Kenji Hamada, Kyoto (JP); Daiki Yamamoto, Kyoto (JP)

(73) Assignee: Totani Corporation, Kyoto (JP)

(*) Notice: Subject to any disclaimer, the term of this patent is extended or adjusted under 35 U.S.C. 154(b) by 511 days.

(21) Appl. No.: 18/262,752

(22) PCT Filed: Jan. 24, 2022

(86) PCT No.: PCT/JP2022/002390
§ 371 (c)(1),
(2) Date: Jul. 25, 2023

(87) PCT Pub. No.: WO2022/185776
PCT Pub. Date: Sep. 9, 2022

(65) Prior Publication Data
US 2025/0010509 A1 Jan. 9, 2025

(30) Foreign Application Priority Data
Mar. 1, 2021 (JP) ............................. JP2021-031783

(51) Int. Cl.
*B26D 7/08* (2006.01)
*B26D 1/06* (2006.01)
(Continued)

(52) U.S. Cl.
CPC ............. *B26D 7/088* (2013.01); *B26D 1/065* (2013.01); *B26D 1/085* (2013.01); *B31B 70/18* (2017.08);
(Continued)

(58) Field of Classification Search
CPC ..... B65B 43/04; B65B 43/465; B65B 61/005; B65B 61/06; B65B 61/10; B31B 2155/00;
(Continued)

(56) References Cited

U.S. PATENT DOCUMENTS

2012/0090441 A1* 4/2012 Abe ..................... B26D 7/1818
83/111

FOREIGN PATENT DOCUMENTS

CN 111390988 A * 7/2020 ............... B26D 1/08
JP 2805515 B2 9/1998
(Continued)

OTHER PUBLICATIONS

English language translation of CN-111390988-A to Lu Tao.*
(Continued)

*Primary Examiner* — Evan H Macfarlane
(74) *Attorney, Agent, or Firm* — NovoTechIP International PLLC

(57) ABSTRACT

It is an object of the present application to prevent a waste from being attached to the upper blade or the lower blade of a crosscut device reliably.
A waste removing device 5 for a bag making apparatus is attached to the bag making apparatus which makes a plastic bag from plastic films 10, 11. The apparatus comprises a crosscut device 31 configured to crosscut the plastic films 10, 11. The crosscut device 31 comprises upper and lower blades 310, 311. The waste removing device 5 comprises a scraper portion 50 configured to sweep a waste W from the upper or lower blade 310, 311. The waste W is made from the plastic films 10, 11 with the crosscut device 31.

2 Claims, 10 Drawing Sheets

(51) Int. Cl.

| | |
|---|---|
| ***B26D 1/08*** | (2006.01) |
| ***B26D 7/18*** | (2006.01) |
| ***B31B 70/18*** | (2017.01) |
| *B26D 1/00* | (2006.01) |
| *B31B 70/10* | (2017.01) |
| *B31B 170/10* | (2017.01) |

(52) U.S. Cl.
CPC .... *B26D 2001/0066* (2013.01); *B26D 7/1863* (2013.01); *B31B 70/10* (2017.08); *B31B 2170/10* (2017.08)

(58) Field of Classification Search
CPC .. B31B 70/14–20; B26D 7/18; B26D 7/1818; B26D 7/1836; B26D 7/1863; B26D 7/088; B26D 1/06; B26D 1/065; B26D 1/08; B26D 1/085; B26D 1/09; B26D 1/095
See application file for complete search history.

(56) References Cited

FOREIGN PATENT DOCUMENTS

| | | | | | |
|---|---|---|---|---|---|
| JP | 2008023666 A | | 2/2008 | | |
| JP | 2011005603 A | | 1/2011 | | |
| JP | 6247674 B2 | | 12/2017 | | |
| JP | 2018176641 A | * | 11/2018 | ............. | B31B 70/20 |
| JP | 2018199215 A | | 12/2018 | | |
| JP | 2019018321 A | | 2/2019 | | |

OTHER PUBLICATIONS

English language translation of JP-2018176641-A to Totani Mikio.*
English language translation of JP 2008023666 A to Dai Nippon Printing Co Ltd (Year: 2008).*

* cited by examiner

WASTE REMOVING DEVICE FOR BAG MAKING APPARATUS AND BAG MAKING APPARATUS

TECHNICAL FIELD

This application relates to a waste removing device for an apparatus which makes bags from films, and a bag making apparatus.

BACKGROUND

In a plastic bag making apparatus described in Patent Document 1 (JP2805515B) plastic films are intermittently fed by feed rollers and slit along its longitudinal slit line. Then, the plastic films are crosscut by a crosscut device when being stopped temporarily so that the plastic bags are made.

In the plastic bag making apparatus, the plastic films are punched and corner-cut at its corner by a corner-cut device when being stopped temporarily. Then, the plastic films are crosscut by the crosscut device. The crosscut device operates twice at both sides spaced across a width cut reference line of the plastic films so as to crosscut the plastic films twice. As a result, any projected uneven edge is not formed at the corner cut area of the plastic bag.

In the apparatus, a linear waste is formed widthwise of the plastic film because the plastic film is crosscut twice at both sides spaced across its width cut reference line after the plastic films are slit and punched.

By the way, the crosscut device comprises upper and lower blades. Generally, the plastic film is composed of a laminate film. Static electricity is readily generated on the laminate film so that the waste may be attached to the upper or lower blade by the static electricity generation.

The laminate film is composed of a base layer and a sealant layer laminated to each other. The sealant layer is composed of a material with a low melting point so as to function as an adhesive when being heat-sealed. However, the sealant layer of the waste may be attached to the upper or lower blade when the laminate film receives a great shear force by the operation of the crosscut device.

The waste may blunt the subsequent crosscut performance when being attached to the upper or lower blade. The waste attached to the upper or lower blade may be further cut shorter and mixed into the plastic bag as a fine foreign material. The waste is mixed into the plastic bag and the content thereof.

On the other hand, in the plastic bag making apparatus described in Patent Document 2 (JP2018-199215A), the waste can be suctioned in and discharged from a suction path. The apparatus comprises an optical sensor for detecting the wastes when suctioning it. The apparatus can determine whether all of wastes of each area are discharged.

The apparatus can determine whether the wastes are discharged but cannot prevent the waste from being attached to the upper or lower blade of the crosscut device.

SUMMARY

It is an object of the present application to provide a waste removing device for a bag making apparatus and a bag making apparatus which can prevent a waste from being attached to the upper or lower blade of the crosscut device reliably.

In the aspect, the present application provides a waste removing device for a bag making apparatus attached to the bag making apparatus which makes a bag from plastic film, wherein the apparatus comprises a crosscut device configured to crosscut the plastic film, the crosscut device comprises upper and lower blades, and the waste removing device comprises a scraper portion configured to sweep a waste from the upper or lower blade, the waste being made from the plastic film with the crosscut device.

According to a preferred embodiment of the present application, wherein the scraper portion comprises a main body portion, and a brush portion mounted on the main body portion and configured to sweep the waste from the upper or lower blade.

According to a preferred embodiment of the present application, wherein the waste removing device comprises a transmission mechanism configured to transmit elevation and descent of the upper blade, and the scraper portion is movable close to an edge of the upper blade according to the descent of the upper blade and away from the edge of the upper blade according to the elevation of the upper blade by the transmission mechanism.

According to a preferred embodiment of the present application, wherein the transmission mechanism is configured to rotate the scraper portion according to the elevation and descent of the upper blade.

According to a preferred embodiment of the present application, wherein the transmission mechanism comprises a plate configured to be moved upwardly and downwardly according to the elevation and descent of the upper blade, a cam groove mounted on the plate, and a cam follower fitted into the cam groove.

According to a preferred embodiment of the present application, wherein the waste removing device further comprises a suction mechanism configured to suction the waste swept from the upper or lower blade.

According to a preferred embodiment of the present application, wherein the suction mechanism comprises a cover portion configured to cover the scraper portion and come in contact with the lower blade.

The waste removing device for the bag making apparatus and the bag making apparatus can prevent a waste from being attached to the upper or lower blade of the crosscut device.

DETAILED DESCRIPTION

A waste removing device for a bag making apparatus and a bag making apparatus according to the present application will be explained below with reference to the drawings. Directions X, Y and Z are at right angles to each other.

Figure 1:
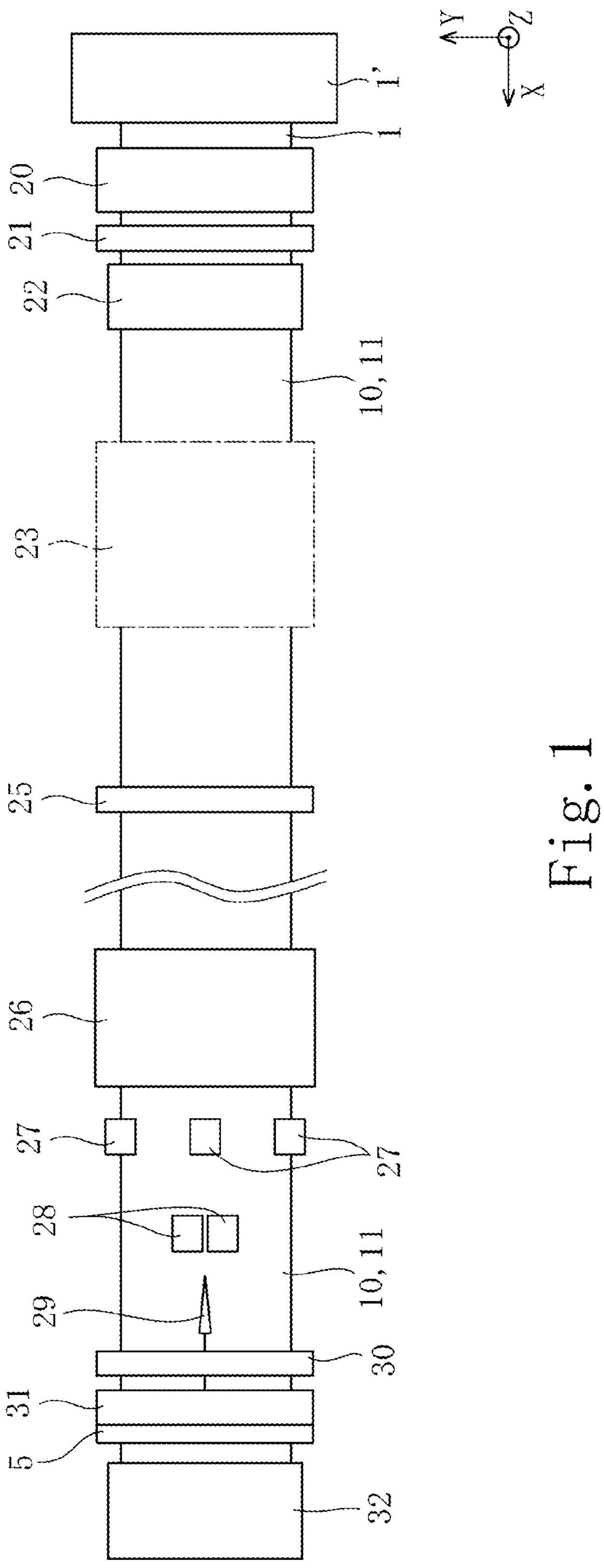
FIG. 1 is a plan view showing a bag making apparatus.
Figure 2:
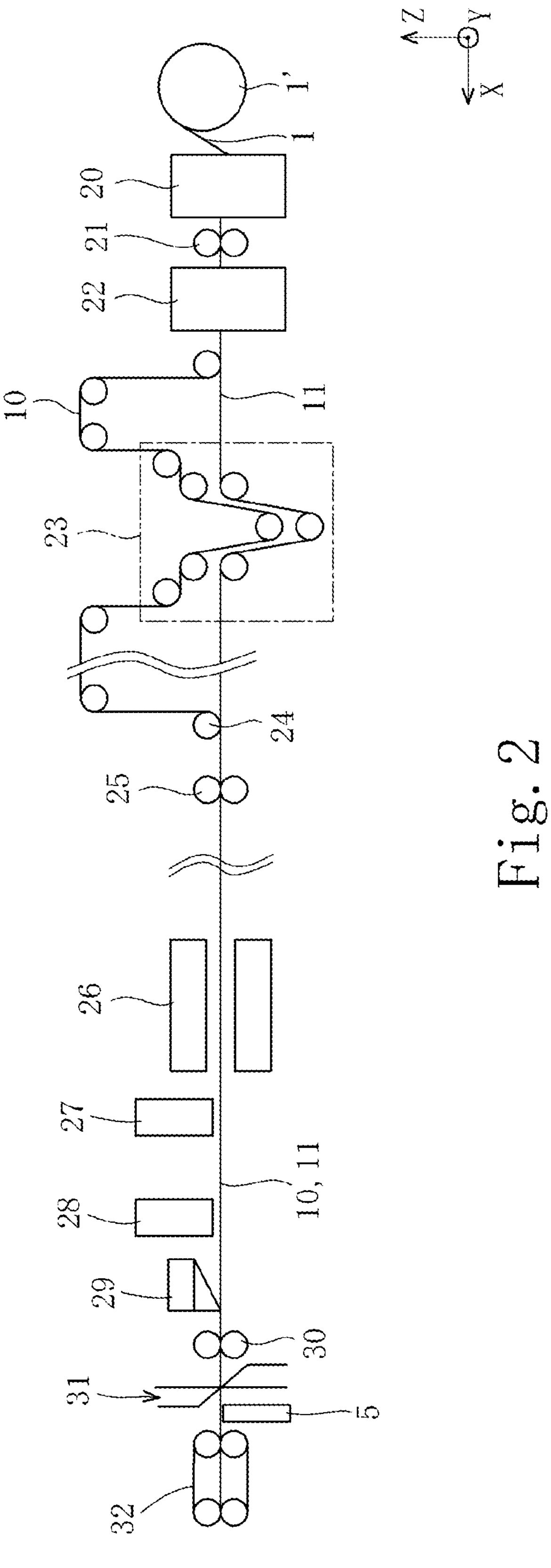
FIG. 2 is a side view showing the bag making apparatus.

FIG. 1 is a plan view showing a plastic bag making apparatus. FIG. 2 is a side view showing the plastic bag making apparatus. The plastic bag making apparatus shown in FIGS. 1 and 2 can make plastic bags two by two. The plastic bag making apparatus comprises an accumulator 20 and feed rollers 21. A plastic film web 1 having a width in a direction Y is continuously drawn by the feed rollers 21 from a roll l' through the accumulator 20 at a constant speed.

The plastic bag making apparatus comprises a slitter 22. The plastic film 1 is slit along the longitudinal direction of the plastic film 1 (the direction X) by the slitter 22 so that two panel materials 10, 11 are formed. The panel materials 10, 11 are opposed to each other in the direction Z and fed in the direction X.

The plastic bag making apparatus comprises a dancer device 23. The panel materials 10, 11 are pass through the dancer device 23. The dancer device 23 can appropriately transform the feed of the panel materials 10, 11 from a continuous feed into an intermittent feed. Therefore, the panel materials 10, 11 are intermittently fed from the downstream of the dancer device 23. Specifically, the panel materials 10, 11 are fed, suspended and fed again at the downstream of the dancer device 23. The intermittent feed has a stop-and-go feeding condition.

The plastic bag making apparatus comprises guide rollers 24. The panel materials 10, 11 are guided to the guide rollers 24 and superposed with each other at the guide rollers 24. The plastic bag making apparatus comprises feed rollers 25. The panel materials 10, 11 superposed with each other are intermittently fed by the feed rollers 25 in the direction X.

The plastic bag making apparatus comprises a heat seal device 26. The heat seal device 26 comprises longitudinal seal devices (not shown) extended in the direction X. The longitudinal seal device heat-seals the panel materials 10, 11 in the longitudinal direction thereof (the direction X) using heat seal members and so on during the suspend of the intermittent feed. Therefore, predetermined portions of the panel materials 10, 11 are heat sealed so that longitudinal sealed portions 12 (FIG. 3) can be formed.

The heat seal device 26 further comprises cross-seal devices (not shown) extended in the direction Y. The cross-seal device heat-seals the panel materials 10, 11 widthwise (in the direction Y) using heat seal members and so on during the suspend of the intermittent feed. Therefore, predetermined portions of the panel materials 10, 11 are heat sealed so that width sealed portions 13 (FIG. 3) can be formed.

Figure 3:
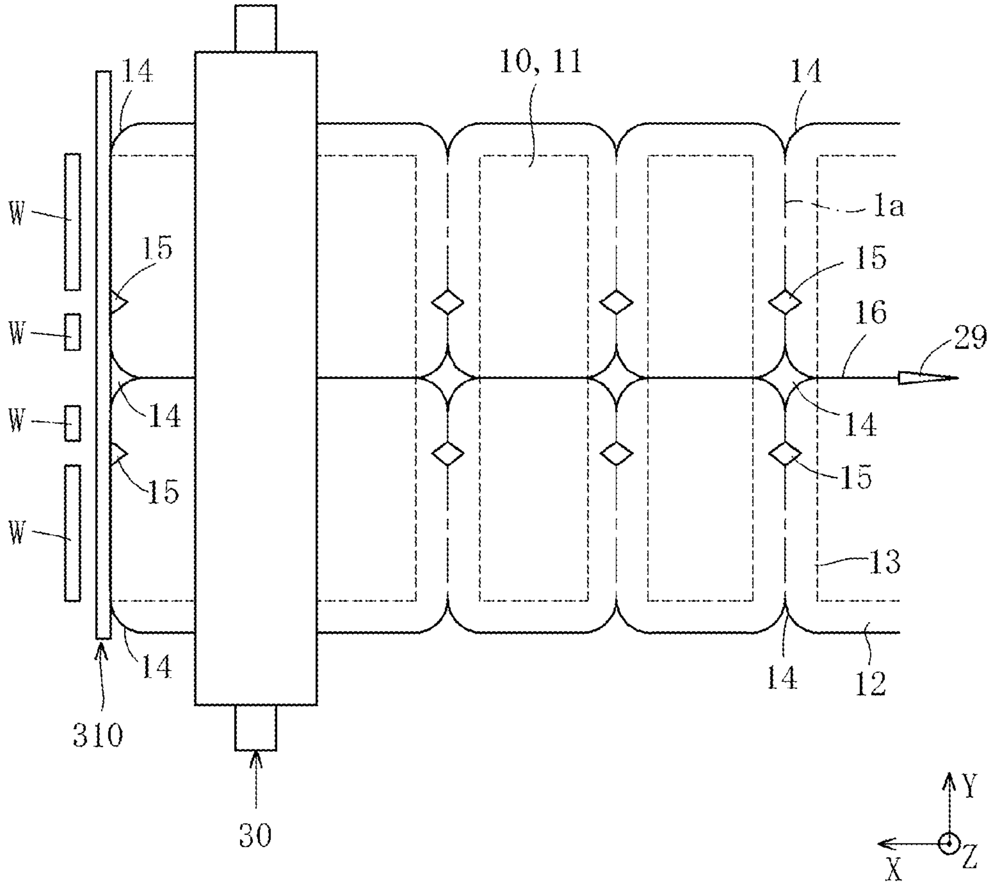
FIG. 3 is an enlarged plan view showing the downstream part of the bag making apparatus.

The plastic bag making apparatus comprises three corner cut devices 27 disposed in the direction Y. The corner cut device 27 punches the panel materials 10, 11 using a punch blade or a Thomson blade and so on in each of the suspends of the intermittent feed so as to form corner cut areas 14 (FIG. 3). The corner cut areas 14 are disposed on the inside of the width sealed portions 13 and at the opposite sides and center widthwise of the panel materials 10, 11 (in the direction Y).

The plastic bag making apparatus comprises two notch forming devices 28 arranged in the direction Y. The notch forming device 28 punches the panel materials 10, 11 using a punch blade and so on in each of the suspends of the intermittent feed so as to form notch areas 15 (FIG. 3). The notch areas 15 are disposed on the inside of the width sealed portions 13 and widthwise of the panel materials 10, 11 (in the direction Y) at a predetermined interval.

The plastic bag making apparatus comprises a slitter 29. The slitter 29 slits the panel materials 10, 11 in its longitudinal direction (direction X) at the center of the width of the panel materials 10, 11 (in the direction Y). Therefore, a slit line 16 (FIG. 3) is formed in the longitudinal direction of the panel materials 10, 11 (direction X) at the center of the width of the panel materials 10, 11 (in the direction Y). The plastic bag making apparatus comprises feed rollers 30. The panel materials 10, 11 are intermittently fed in the direction X by the feed rollers 30.

Figure 4B:
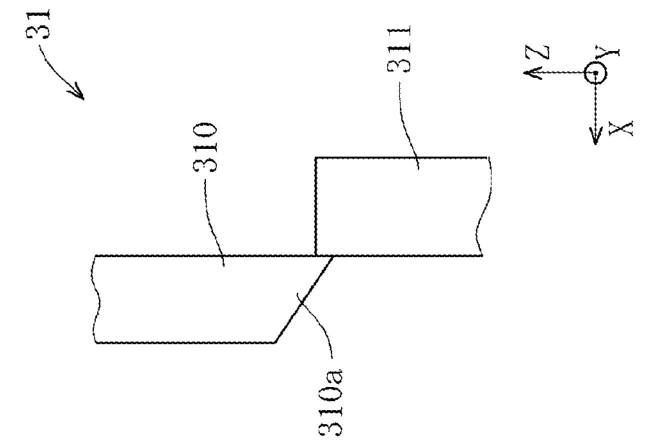
FIG. 4B is a side view of the FIG. 4A.
Figure 4A:
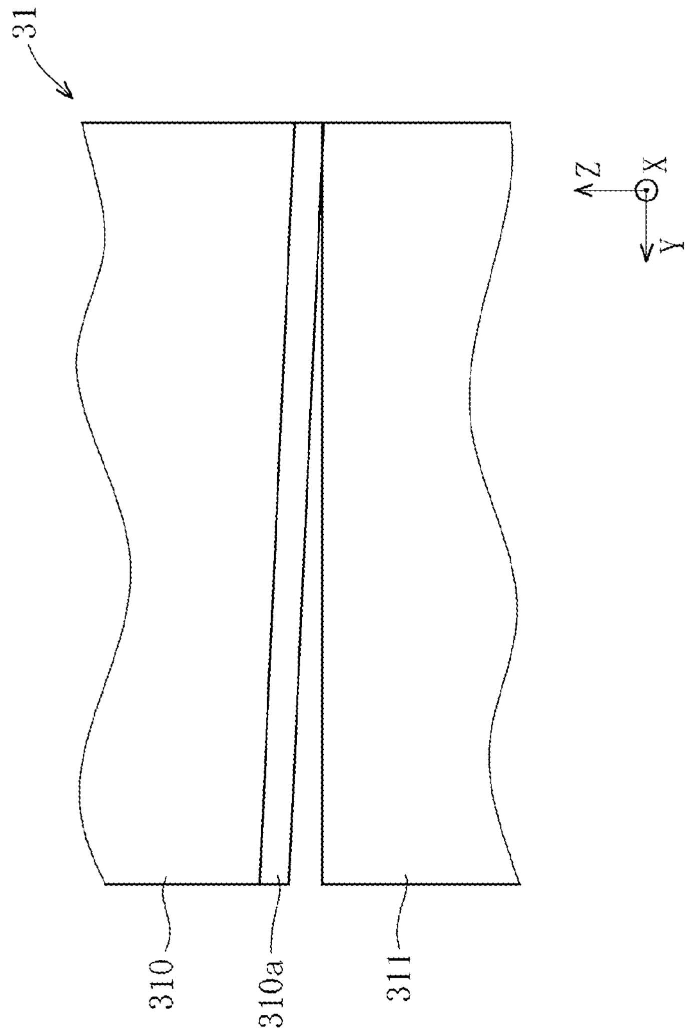
FIG. 4A is a front view showing upper and lower blades of a crosscut device.

The plastic bag making apparatus comprises a crosscut device 31. As shown in FIG. 4, the crosscut device 31 comprises upper and lower blades 310, 311. The upper blade 310 is moved by a drive mechanism (not shown) in a vertical direction (direction Z) and the lower blade 311 is fixed and unmoved. The drive mechanism can be composed of a well-known art such as a crank mechanism. The upper end of the lower blade 311 is composed of a flat surface extended in a horizontal direction (direction Y), see FIG. 4B. The edge 310*a* of the upper blade 310 is inclined relative to the horizontal direction (direction Y). One end side (right side of FIG. 4A) of the edge 310*a* of the upper blade 310 is superposed and engaged with the lower blade 311 even when the upper blade 310 is moved upward (FIG. 4B), so that the panel materials 10, 11 can be smoothly sheared from its one end by the lower movement of the upper blade 310.

The crosscut device 31 crosscuts the panel materials 10, 11 in the width direction of the panel materials 10, 11 (direction Y) using the upper and lower blades 310, 311 in each of the suspends of the intermittent feed. The portion to be crosscut is disposed on the inside of the width sealed portions 13 of the panel materials 10, 11. In the embodiment, the plastic bag making apparatus can make plastic bags two by two so that two plastic bags are made from the panel materials 10, 11 in each of crosscuts.

The plastic bag making apparatus comprises a feed device 32. The feed device 32 comprises a pair of conveyers opposed to each other in the direction Z. The feed device 32 is configured to feed the plastic bag made from the panel materials 10, 11 intermittently according to the timing of the crosscut.

The crosscut device 31 can be moved between the upstream and downstream sides of the direction X at a predetermined interval D using a drive mechanism (not shown). The drive mechanism is composed of a well-known art such as a ball screw mechanism. The panel materials 10, 11 are crosscut by the crosscut device 31. The panel materials 10, 11 are moved to both sides of the cut reference line 1*a* (FIG. 3) in the width direction (direction Y) spaced at the interval D and the crosscut device 31 crosscuts the panel materials 10, 11 twice. As a result, any projected uneven edge is not formed at the notch areas 15 and the corner cut areas 14.

According to the apparatus, the panel materials 10, 11 are crosscut twice at both sides of the cut reference line 1*a* widthwise spaced at the interval D so that wastes W having the width of the interval D are made when the panel materials 10, 11 are crosscut. That is to say, the waste W is extended between the notch areas 15 and the corner cut areas 14 of the panel materials 10, 11 and has the width of the interval D. Therefore, in the embodiment, the four linear wastes W are made, as shown in FIG. 3.

As described above, the panel materials 10, 11 are composed of the plastic film 1. Generally, the plastic film 1 is composed of a laminate film. Static electricity is readily generated on the laminate film so that the waste W may be attached to the upper or lower blade 310, 311 of the crosscut device 31 by the static electricity generation.

The laminate film is composed of a base layer and a sealant layer laminated to each other. The sealant layer is composed of a material with a low melting point so as to function as an adhesive when being heat-sealed by the heat seal device 26. However, the sealant layer of the waste W may be attached to the upper or lower blade 310, 311 when the laminate film receives a great shear force by the operation of the crosscut device 31.

The waste W may blunt the subsequent crosscut performance when being attached to the upper or lower blade 310, 311. The waste W attached to the upper or lower blade 310, 311 may be further cut shorter and mixed into the plastic bag as a fine foreign material. The waste W is mixed into the plastic bag and the content thereof.

Therefore, the apparatus comprises a waste removing device 5 configured to reliably remove the waste W from the upper and lower blades 310, 311. As shown in FIGS. 1 and 2, the waste removing device 5 is adjacent to the downstream side of the crosscut device 31. The waste removing device 5 together with the crosscut device 31 can be moved between the upstream and downstream sides of the direction X at the interval D using a drive mechanism (not shown).

Figure 5:
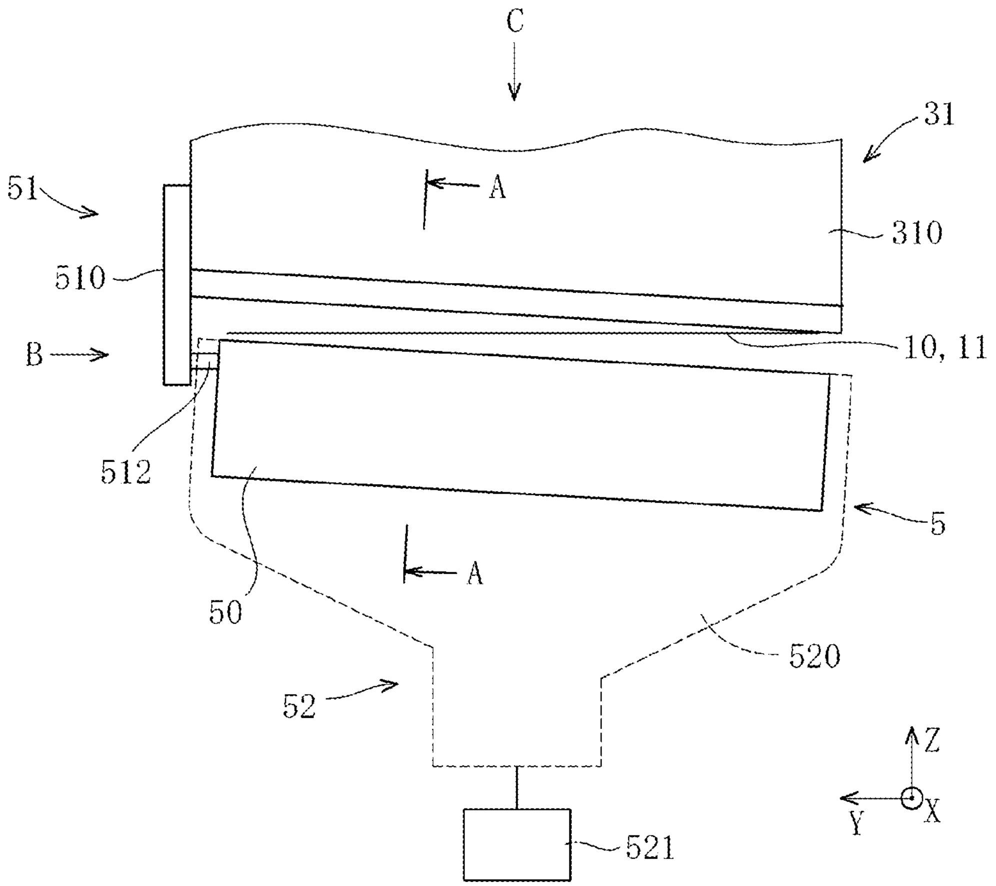
FIG. 5 is a front view showing a waste removing device.
Figure 6:
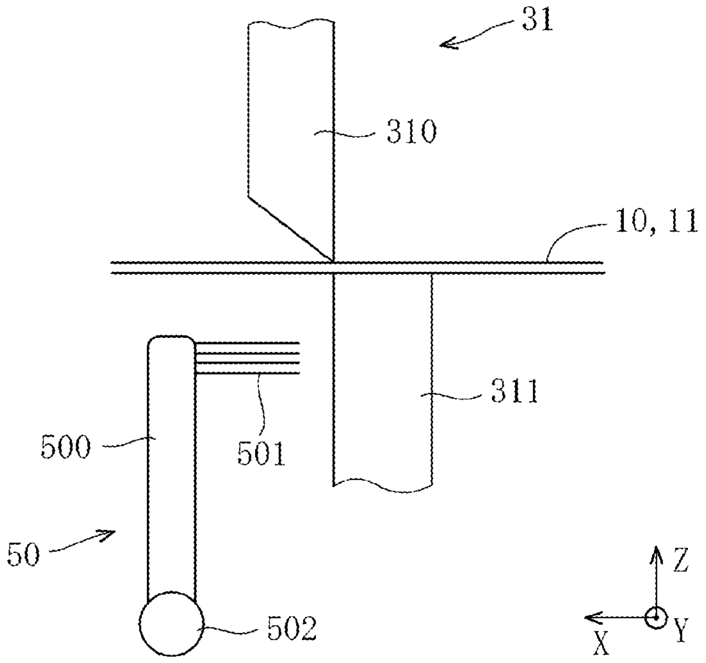
FIG. 6 is a cross sectional view taken on line A-A of FIG. 5.

As shown in FIGS. 5 and 6, the waste removing device 5 comprises a scraper portion 50. The scraper portion 50 is extended to have the approximately same length as the width of the panel materials 10, 11 and the length of the upper and lower blades 310, 311. The scraper portion 50 is configured to sweep the waste W from the upper or lower blade 310, 311.

The panel materials 10, 11 are crosscut by the crosscut device 31 so that the waste W may be made from the panel materials 10, 11 and attached to any point of the upper or lower blade 310, 311. As a result, the scraper portion 50 is extended longer than the width of the panel materials 10, 11 so as to sweep the waste W attached to any point of the upper or lower blade 310, 311. Therefore, the scraper portion 50 can sweep the waste W from the upper or lower blade 310, 311 regardless the position of the waste W made from the panel materials 10, 11.

As shown in FIG. 5, the upper end of the scraper portion 50 is inclined relative to the horizontal direction (direction Y) and parallel to the upper end of the upper blade 310 similarly to the upper blade 310. The panel materials 10, 11 are subject to be shear by the movement upwardly and downwardly of the upper blade 310 so that the waste W is often attached to the upper blade 310. The scraper portion 50 is parallel to the upper blade 310 so as to reliably sweep the waste W from the upper blade 310.

As shown in FIG. 6, the scraper portion 50 comprises a main body portion 500 and a brush portion 501 disposed along the upper end of the main body portion 500. The brush portion 501 is extended from the main body portion 500 to the upper and lower blades 310, 311 in the direction X. The brush portion 501 is composed of a plurality of bristles made from synthetic or native resin and so on and attached to the main body portion 500 so as to have a predetermined thickness in the direction Z. Therefore, it is possible to create more area where the brush portion 501 can sweep the waste W from the upper and lower blades 310, 311. As a result, it is possible to sweep the waste W from the upper and lower blades 310, 311 reliably.

As shown in FIG. 5, the waste removing device 5 comprises a transmission mechanism 51 configured to transmit the movement of the upper blade 310 upwardly and downwardly. The scraper portion 50 is movable close to the edge 310*a* of the upper blade 310 according to the descent of the upper blade 310 and away from the edge 310*a* of the upper blade 310 according to the elevation of the upper blade 310 by the transmission mechanism 51. The transmission mechanism 51 comprises a plate 510 attached to the upper blade 310 and moved upwardly and downwardly according to the movement of the upper blade 310. The plate 510 is extended in the direction Z.

Figure 7:
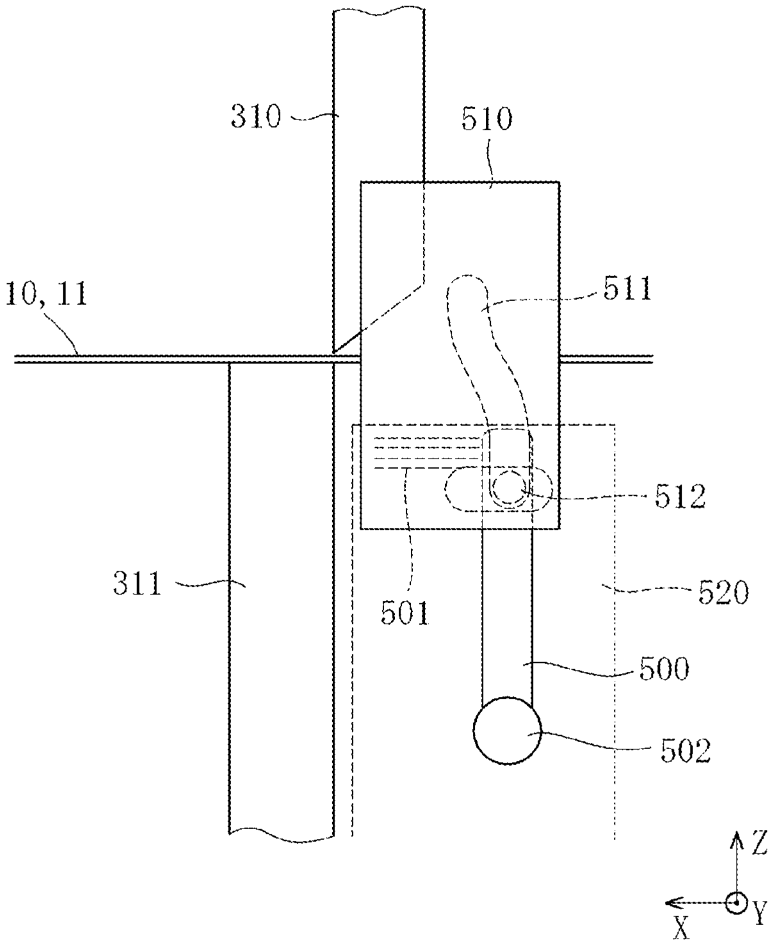
FIG. 7 is a view in a direction B of FIG. 5.

The transmission mechanism 51 comprises a cam groove 511 mounted on the plate 510 (FIG. 7). The cam groove 511 is shaped and extended in the direction Z. The transmission mechanism 51 comprises a cylindrical cam follower 512 attached to and projected from the main body portion 500 of the scraper portion 50 in the direction Y. The cam follower 512 is fitted into the cam groove 511. The transmission mechanism 51 is mounted not only on the one side of the upper blade 310 but also on the both sides thereof.

Therefore, the transmission mechanism 51 is configured to move the plate 510 upwardly and downwardly according to the elevation and descent of the upper blade 310 so as to move the cam groove 511 according to the elevation and descent of the plate 510, and then the main body portion 500 of the scraper portion 50 is moved according to the elevation and descent of the cam groove 511. The transmission mechanism 51 is composed of a mechanical structure with the cam groove 511, the cam follower 512 and so on so as to be a simple structure having low parts count and excellent in productivity and reduce failures.

As shown in FIG. 6, the scraper portion 50 comprises a rotational shaft 502 at the lower end of the main body portion 500 so as to be rotated about the rotational shaft 502. The scraper portion 50 is rotated so as to reciprocate the brush portion 501 relative to the upper and lower blades 310, 311. As a result, the brush portion 501 is away from the upper blade 310 before crosscutting the panel materials 10, 11 so as not to be an obstacle in the crosscut of the crosscut device 31. On the other hand, the brush portion 501 is close to the upper blade 310 after crosscutting the panel materials 10, 11 so as to sweep the waste W attached to the upper and lower blades 310, 311 reliably.

Figure 8:
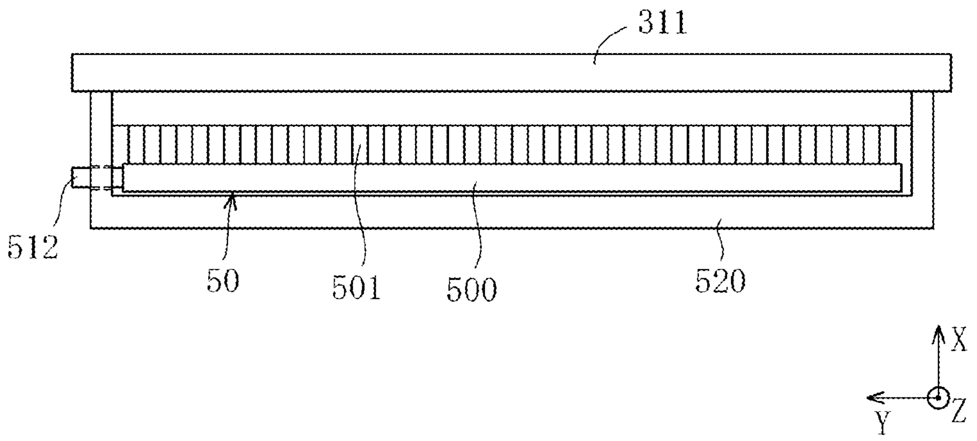
FIG. 8 is a view in a direction C of FIG. 5.

As shown in FIG. 5, the waste removing device 5 comprises a suction mechanism 52. The suction mechanism 52 is configured to suction the waste W swept from the upper and lower blades 310, 311. The suction mechanism 52 comprises a cover portion 520 to cover the scraper portion 50. The cover 520 is fun-shaped in a front view (FIG. 5), U-shaped in a plan view (FIG. 8) and comes in contact with the lower blade 311. As a result, an enclosure is formed between the cover portion 520 and the lower blade 311 (FIG. 8). The scraper portion 50 is placed inside the enclosure.

The suction mechanism 52 comprises a suction source 521 connected with the lower end of the cover portion 520. The suction source 521 is configure to suction the inside of the cover portion 520. As above stated, the inside of the cover portion 520 is enclosed to enhance efficiency of suction so that a downward airflow can be generated from the upper side of the brush portion 501 by the suction source 521 so as to reliably suction and remove the waste W swept by the scraper portion 50.

Next, the operations of the crosscut device 31 and the waste removing device 5 will be explained below.

Figure 9A:
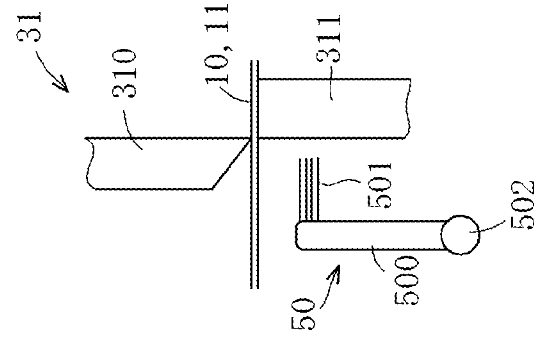
FIG. 9 is an explanatory view for describing operations of the waste removing device.

The panel materials 10, 11 are fed to the crosscut device 31 and suspended (FIG. 9A). The panel materials 10, 11 are gripped by the feed device 32 under tension. The upper blade 310 stays at an upper dead point, and the panel materials 10, 11 suspend between the upper and lower blades 310, 311. In the scraper portion 50, the main body portion 500 is extended in the direction Z, and the brush portion 501 is away from the upper and lower blades 310, 311 so as not to be an obstacle in the crosscut of the crosscut device 31.

Figure 9B:
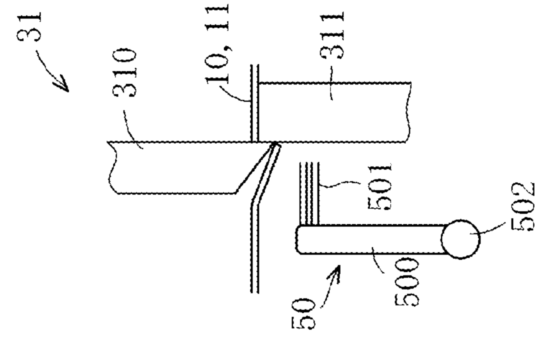

Then, the upper blade 310 lowers from the upper dead point while the panel materials 10, 11 suspend (FIG. 9B). As a result, the panel materials 10, 11 are cut from its one end (FIG. 4A). Then, the upper blade 310 further lowers (FIG. 9C) to the lower dead point (FIG. 9D) so that the panel materials 10, 11 are cut in the width direction (direction Y).

Figure 9C:
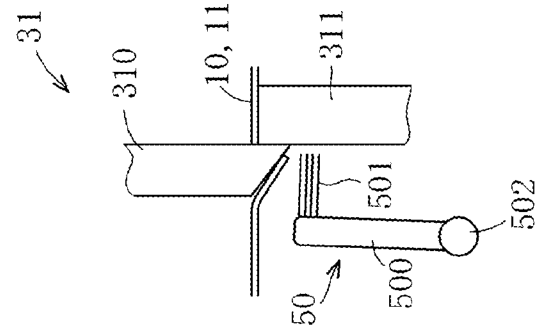
Figure 9D:
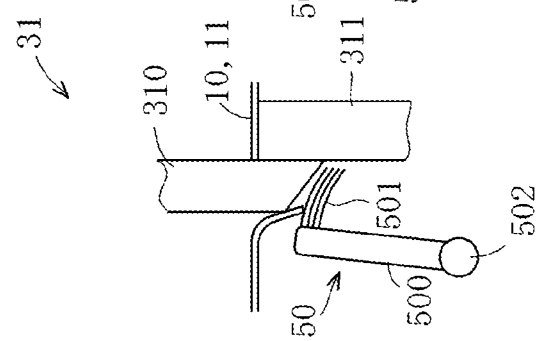

The plate 510 of the transmission mechanism 51 lowers according to the descent of the upper blade 310 (FIG. 5). The cam groove 511 lowers according to the descent of the plate 510. The cam follower 512 mounted on the main body portion 500 of the scraper portion 50 is moved along the cam groove 511. Therefore, the main body portion 500 rotates about the rotational shaft 502 so that the brush portion 501 is close to the upper blade 310 (FIGS. 9C and 9D).

Figure 9E:
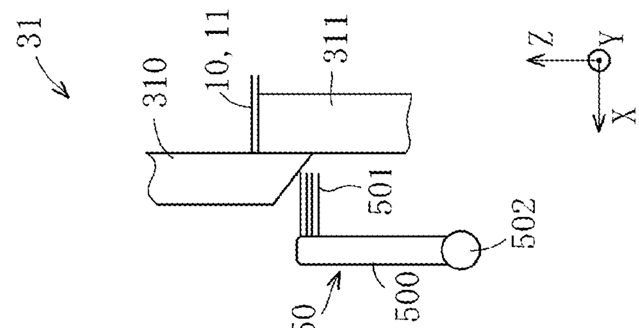

Then, the upper blade 310 elevates (FIG. 9E), whereby the crosscut is completed.

The plate 510 (FIG. 5) of the transmission mechanism 51 elevates according to the elevation of the upper blade 310. The cam groove 511 elevates according to the elevation of the plate 510. The cam follower 512 mounted on the main body portion 500 of the scraper portion 50 is moved along the cam groove 511. Therefore, the main body portion 500 rotates about the rotational shaft 502 and returns so that the brush portion 501 is away from the upper blade 310.

As a result, the brush portion 501 is away from the upper and lower blades 310, 311 so as not to be an obstacle in the crosscut of the crosscut device 31.

Figure 10A:
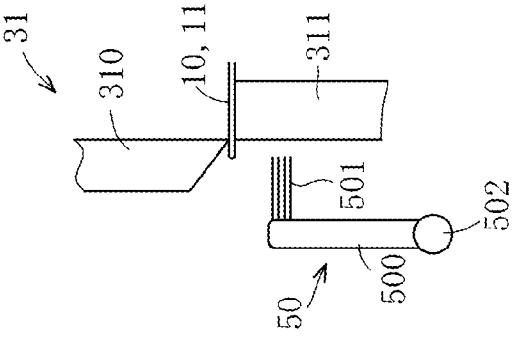
FIG. 10 is an explanatory view following FIG. 9.

Then, the crosscut device 31 and the waste removing device 5 are moved toward the upstream side in the direction X by the distance D while the panel materials 10, 11 suspend (FIG. 10A). As a result, the crosscut downstream end of the panel materials 10, 11 projects to the downstream from the edge of the upper blade 310 by the distance D.

Figure 10B:
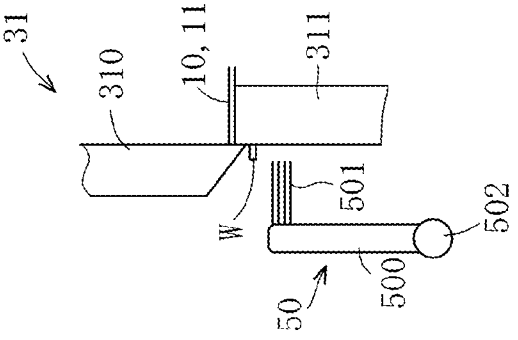
Figure 10C:
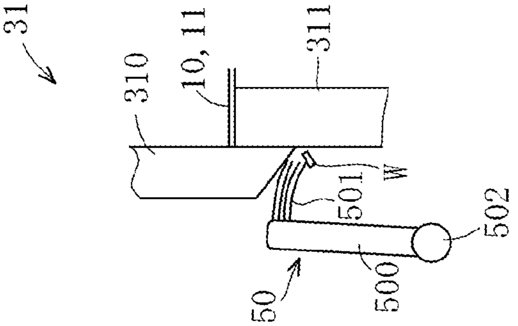
Figure 10D:
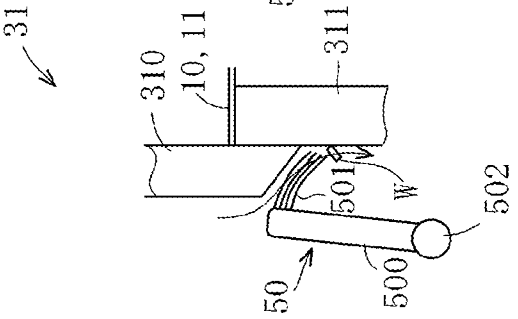

Then, the upper blade 310 lowers from the upper dead point while the panel materials 10, 11 suspend (FIG. 10B). As a result, the panel materials 10, 11 are cut from its one end (FIG. 4A). Then, the upper blade 310 further lowers (FIG. 10C). The panel materials 10, 11 are cut in the width direction (direction Y) when the upper blade 310 lowers to the lower dead point (FIG. 10D). As such, the crosscut device 31 is twice operated at both sides of the cut reference line 1*a* (FIG. 3) in the width direction (direction Y) of the panel materials 10, 11 spaced at the interval D so that the panel materials 10, 11 are crosscut twice, whereby any projected uneven edge is not formed at the notch areas 15 and the corner cut areas 14 of the plastic bag.

The panel materials 10, 11 are crosscut twice at both sides of the width cut reference line 1*a* by the interval D, whereby the waste W having a width of the interval D (FIG. 10D) is formed when the panel materials 10, 11 are crosscut. That is to say, the waste W is extended between the notch areas 15 and the corner cut areas 14 of the panel materials 10, 11 and has the width of the interval D. Therefore, in the embodiment, the four linear wastes W are made, as shown in FIG. 3.

The plate 510 (FIG. 5) of the transmission mechanism 51 lowers according to the descent of the upper blade 310. The cam groove 511 lowers according to the descent of the plate 510. The cam follower 512 mounted on the main body portion 500 of the scraper portion 50 is moved along the cam groove 511. Therefore, the main body portion 500 rotates about the rotational shaft 502 so that the brush portion 501 is close to the upper blade 310 (FIGS. 10C and 10D). The waste W is attached to the surface of the upper blade 310 at first, on the other hand the brush portion 501 brushes the surface of the upper blade 310. Therefore, the brush portion 501 can sweep the waste W attached to the upper and the lower blades 310, 311 reliably.

The brush portion 501 is parallel to the upper end of the scraper portion 50, inclined relative to the horizontal direction (direction Y) and parallel to the upper end of the upper blade 310. Thus, the operation of the brush portion 501 sweeping the upper blade 310 is performed along the entire length of the width direction (direction Y) of the panel materials 10, 11 at almost the same timing as the descent of the upper blade 310. Therefore, the brush portion 501 can sweep the waste W attached to the upper and lower blades 310, 311 reliably.

A suction air is already started by the suction source 521 of the suction mechanism 52 (FIG. 5) when the panel materials 10, 11 are crosscut (FIG. 10D). As a result, an air is generated downwardly in a narrow pathway between the edge of the brush portion 501 and the surface of the lower blade 311, and further the brush portion 501 is moved downwardly along the surface of the lower blade 311. The synergetic effect of the two actions makes the waste W removed downward reliably.

Figure 10E:
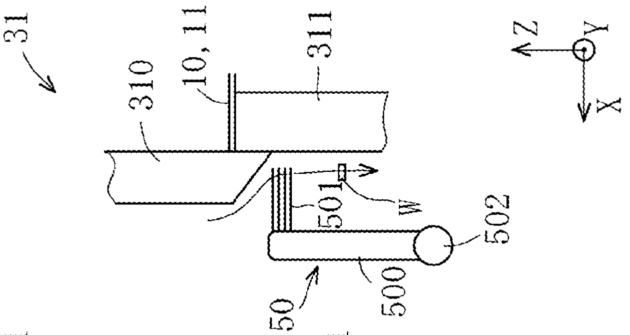
Figure 11:
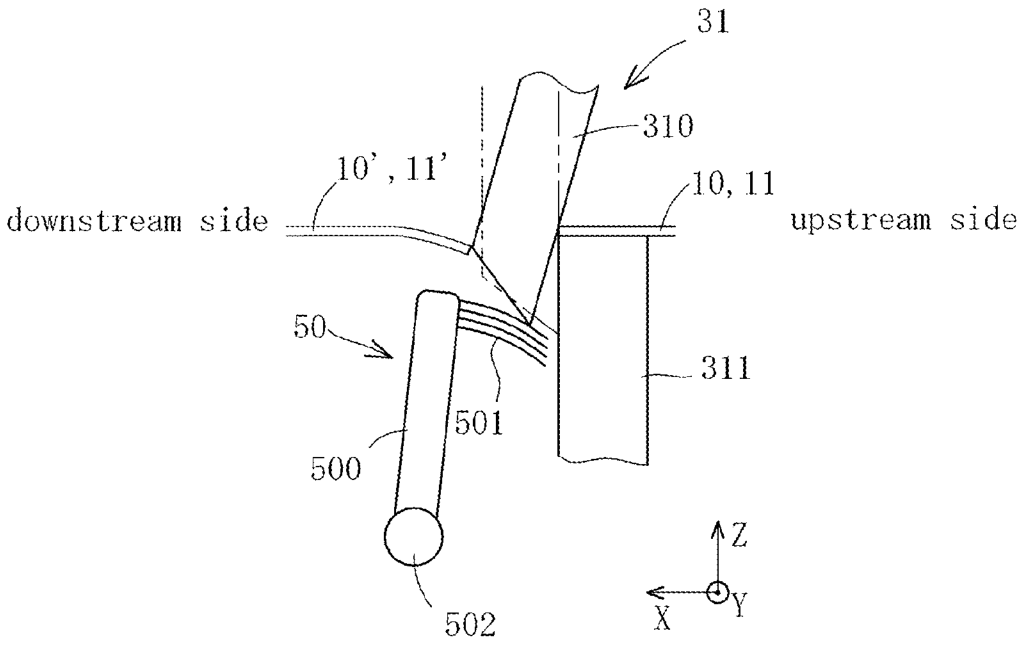
FIG. 11 is an explanatory view showing another embodiment.

Then, the upper blade 310 elevates (FIG. 10E), whereby the crosscut is completed. The plate 510 (FIG. 5) of the transmission mechanism 51 elevates according to the elevation of the upper blade 310. The cam groove 511 elevates according to the elevation of the plate 510. The cam follower 512 mounted on the main body portion 500 of the scraper portion 50 is moved along the cam groove 511. Therefore, the main body portion 500 rotates about the rotational shaft 502 and returns so that the brush portion 501 is away from the upper blade 310. As a result, the brush portion 501 is away from the upper and lower blades 310, 311 so as not to be an obstacle in the crosscut of the crosscut device 31.

Then, the crosscut device 31 and the waste removing device 5 are moved to the downstream side by the interval D and returned to their original positions. As above stated, the panel materials 10, 11 are moved in the direction X and then suspended. The panel materials 10, 11 are moved to both sides of the cut reference line 1*a* spaced at the interval D and crosscut twice.

As above stated, the first crosscut is operated to the panel materials 10, 11, and the crosscut device 31 and the waste removing device 5 are moved to the upstream side in direction X by the distance D, and then the second crosscut is operated to the panel materials 10, 11. At this time, if the upstream end of the panel materials 10, 11 being cut at the downstream side is disposed to interfere with the downstream end of the upper blade 310, a harmful effect can be generated during the cut of the waste W that followed. Therefore, it is preferred that the panel materials 10, 11 being cut at the downstream side is fed by the feed device 32 immediately after the first crosscut is operated to the panel materials 10, 11.

In another embodiment, when the upper blade 310 lowers to the lower dead point, the upper blade 310 may be inclined clockwise in FIG. 1 (the upper portion of the upper blade 310 is inclined) to be away from the lower blade 311. It is preferred that this operation is performed immediately after the first crosscut is operated to the panel materials 10, 11 (FIG. 9), on the other hand this operation is not performed after the second crosscut (FIG. 10). This operation can be performed by a well-known structure, for example, an air cylinder (not shown) being disposed adjacent to the upper portion of the upper blade 310. The air cylinder presses the upper portion of the upper blade 310 to the upstream side when the upper blade 310 lowers to the lower dead point so that the operations can be performed.

The panel materials 10', 11' crosscut at the downstream side are quickly moved to the downstream side after the first crosscut is operated to the panel materials 10, 11 by the operation. As a result, the crosscut panel materials 10', 11' do not interfere with the second crosscut. Therefore, the waste W made by the second crosscut is prevented from flying to the downstream side carelessly.

As described above, preferred embodiments according to the present application are explained. However, constructions according to the present application are not limited to the embodiments.

The scraper portion 50 can comprise, for example, a claw portion having a sharp end instead of the brush portion 501.

The claw portion can be made with a flexible substance so as to be deformed along the surface of the upper or lower blade 310, 311. As a result, the claw portion can sweep the waste W from the upper or lower blade 310, 311.

The transmission mechanism 51 can comprise, for example, a detect means configured to detect the upwardly and downwardly movement of the upper blade 310 and a driving mechanism configured to move the scraper portion 50 so that the scraper portion 50 can be moved by the drive mechanism based on the detection of the detect means.

The drive mechanism can be composed of a known mechanism such as a stepping motor connected with the rotational shaft 502.

The length of the bristles on the brush portion 501, the travel distance (angle of rotation) of the scraper portion 50 or the timing of the movement of the scraper portion 50 can be changed in accordance with the kind of the plastic bag to be made, for example, the difference of the size or material of the plastic bag.

The suction source 521 of the suction mechanism 52 is driven so as to suction the waste W before the waste W is made, however the suction source 521 can be driven constantly so as to suction the waste W reliably.

The waste W can be reliably suctioned by the constant suction. The constant suction can be controlled easily so that it is excellent in productivity and cost.

A Teflon (registered Trade Mark) coating or sandblasting may be performed on the surface of the upper blade 310. Therefore, it is possible to reduce an adhesion force between the panel materials 10, 11 and the upper blade 310 so as to remove the waste W reliably.

The waste W can be reliably suctioned by the constant suction. The constant suction can be controlled easily so that it is excellent in productivity and cost.

A Teflon (registered Trade Mark) coating or sandblasting may be performed on the surface of the upper blade 310. Therefore, it is possible to reduce an adhesion force between the panel materials 10, 11 and the upper blade 310 so as to remove the waste W reliably.

The effect of the present application will be explained.

The waste removing device for the plastic bag making apparatus according to the present application is attached to the apparatus for making plastic bags from plastic films. The apparatus comprises a crosscut device configured to crosscut the plastic films. The crosscut device comprises upper and lower blades. The waste removing device comprises a scraper portion configured to sweep the waste made by the crosscut device from the upper and lower blades.

The waste removing device for the plastic bag making apparatus and the plastic bag making apparatus can prevent the waste from being attached to the upper or lower blade of the crosscut device.

Specifically, the scraper portion can prevent the waste from being attached to the upper or lower blade by sweeping the waste even if the waste is attached to the upper or lower blade once.

As a result, it is possible to prevent the crosscut performance from being dull. Further, it is possible to prevent the waste attached to the upper or lower blade from being cut short and introduced as the fine foreign matter into the plastic bag.

It is desirable that the scraper portion comprises a main body portion and a brush portion mounted on the main body portion and configured to sweep the waste from the upper or lower blade. As such, the brush portion can sweep the waste from the upper or lower blade reliably. The brush portion comprises a plurality of flexible bristles made from synthetic or native resin and so on attached to the main body portion. Therefore, it is possible to create more area where the brush portion can sweep the waste from the upper blade. As a result, it is possible to sweep and drop the waste from the upper blade reliably.

The waste removing device comprises a transmission mechanism configured to transmit the elevation and descent of the upper blade. The scraper portion is movable close to the edge of the upper blade according to the descent of the upper blade and away from the edge of the upper blade according to the elevation of the upper blade by the transmission mechanism.

The upper blade is moved downwardly when crosscutting so that the waste may be attached to the surface of the upper blade. However, the scraper portion is close to the edge of the upper blade so as to reliably sweep and drop the waste attached to the upper or lower blade.

The upper blade is moved upwardly after crosscutting so that the scraper portion is away from the edge of the upper blade so as not to be an obstacle in the crosscut.

It is preferable that the transmission mechanism is configured to transmit the elevation and descent of the upper blade so as to rotate the scraper portion.

The scraper portion can be close to and away from the upper and lower blades by rotating so as to be simple structure and excellent in productivity and maintenance.

The scraper portion can be away from the upper blade before crosscutting the panel materials so as not to be an obstacle in the crosscut of the crosscut device. Further, the scraper portion can be close to the upper blade after crosscutting the panel materials so as to reliably sweep and drop the waste attached to the upper or lower blade.

As stated above, the bag is made from plastic but not limited. The bag may be made from a material based on paper, a simple material of polyethylene and so on not plastic nor laminate.

It is preferable that the transmission mechanism comprises a plate configured to be moved upwardly and downwardly according to the elevation and descent of the upper blade, a cam groove mounted on the plate and a cam follower fitted into the cam groove.

As the transmission mechanism is composed of a mechanical structure such as the cam groove, the cam follower and so on, the parts of the device can be few in number, a simple structure, excellent in productivity and reduce failure.

Especially, it is preferable that the waste removing device for the bag apparatus comprises a suction mechanism configured to suction the waste swept from the upper or lower blade.

The suction mechanism suctions the waste swept from the upper or lower blade by the scraper portion so as to reliably remove the waste from the upper or lower blade.

That's to say, the waste swept from the upper or lower blade may be attached to it again by static electricity, however the suction mechanism suctions the waste so as to reliably prevent the waste from being attached to the upper or lower blade.

It is preferable that a cover portion configured to cover the scraper portion and come in contact with the lower blade.

An enclosure is formed between the cover portion and the lower blade. The scraper portion is placed inside the enclosure.

The inside of the cover portion is enclosed to enhance efficiency of suction so as to reliably suction and remove the waste swept by the scraper portion.

What is claimed is:

1. A bag making apparatus for making bags from a web, the apparatus comprising:

feed rollers for intermittently feeding the web in a longitudinal direction of the web;

a crosscut device comprising an upper blade and a lower blade for crosscutting the web while the web is paused; and a waste removing device for removing a waste resulting from crosscutting the web, the waste removing device comprising:

a transmission mechanism configured to transmit an elevation and a descent of the upper blade, and a waste removing member disposed downstream of the lower blade to remove the waste from the upper or lower blade and operably connected to the transmission mechanism, the waste removing member comprising:

a rotational shaft extending in a width direction of the web;

a main body configured to be rotatable around the rotational shaft; and bristles mounted on the main body for sweeping the waste from the upper or lower blade;

wherein the transmission mechanism is configured to rotate the main body around the rotational shaft in accordance with the elevation and the descent of the upper blade, wherein the waste removing member is movable towards the upper and lower blades in accordance with the descent of the upper blade for removal of the waste and away from the upper and lower blades in accordance with the elevation of the upper blade.

2. The bag making apparatus of claim 1, wherein the transmission mechanism comprises:

a plate configured to be movable vertically in accordance with the elevation and the descent of the upper blade, a cam groove mounted on the plate, and a cam follower fitted into the cam groove and attached to the main body.

* * * * *